United States Patent
Iwashita et al.

(10) Patent No.: US 7,498,761 B2
(45) Date of Patent: Mar. 3, 2009

(54) MOTOR CONTROL METHOD AND MOTOR CONTROL APPARATUS

(75) Inventors: Yasusuke Iwashita, Fujiyoshida (JP); Yukio Toyozawa, Koushi (JP); Kenji Takahashi, Koushi (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 211 days.

(21) Appl. No.: 11/699,496

(22) Filed: Jan. 30, 2007

(65) Prior Publication Data

US 2007/0176573 A1 Aug. 2, 2007

(30) Foreign Application Priority Data

Jan. 31, 2006  (JP) .............................. 2006-022670

(51) Int. Cl.
*H02P 1/24* (2006.01)

(52) U.S. Cl. ...................... 318/727; 318/609; 318/610

(58) Field of Classification Search ................. 318/609, 318/610, 461, 727, 798, 721
See application file for complete search history.

(56) References Cited

U.S. PATENT DOCUMENTS

| | | | | |
|---|---|---|---|---|
| 5,271,346 A | * | 12/1993 | Mori | 112/220 |
| 6,777,904 B1 | * | 8/2004 | Degner et al. | 318/609 |
| 7,332,884 B2 | * | 2/2008 | Rozman et al. | 318/432 |

FOREIGN PATENT DOCUMENTS

| | | |
|---|---|---|
| JP | 06-209588 | 7/1994 |
| JP | 08-294295 | 11/1996 |
| JP | 2000-270467 | 9/2000 |

* cited by examiner

*Primary Examiner*—Rina I Duda
(74) *Attorney, Agent, or Firm*—Drinker Biddle & Reath LLP (57) ABSTRACT

A motor control apparatus 1 that controls a rotation speed of a motor driven according to a speed command includes an abnormal-rotation detector 21 which determines that the motor is in an abnormal-rotation state, such as a runaway, when a speed deviation Ver obtained by subtracting a detection speed TSA of a motor rotation from a speed command VCMD is equal to or larger than a threshold value, when a sign of a product of acceleration ΔTSA obtained by subtracting a last detection speed from a detection speed this time that is detected in a predetermined cycle and a torque command Tc obtained by proportionally integrating the speed deviation is negative, and when an integration value VerSUM of the speed deviation Ver exceeds a predetermined value ALMlevel. With this arrangement, an abnormal rotation of the motor can be instantly detected even during acceleration or deceleration of the motor, thereby increasing the performance of protecting the motor.

16 Claims, 11 Drawing Sheets

MOTOR CONTROL METHOD AND MOTOR CONTROL APPARATUS

BACKGROUND OF THE INVENTION

1. Field of the Invention

The present invention relates to a motor control method and a motor control apparatus. Particularly, the invention relates to a motor control method and a motor control apparatus having a function of detecting a state of an abnormal rotation, including runaway, of a motor that is controlled by a software servo.

2. Description of the Related Art

According to a conventional method of detecting an abnormal rotation of a motor, when a speed deviation of a speed feedback to an instructed speed exceeds a predetermined threshold value, this abnormal rotation of the motor is detected as a speed deviation excess.

The following patent document 1 has the title "Overspeed Protection Method for Motor Driven by Inverter Equipment", and discloses a method of changing an overspeed protection range according to a speed command signal.

The following patent document 2 has the title "Method of Detecting a Runaway of a Motor and a Runaway Detecting Apparatus", and discloses a method and an apparatus of detecting a position of a machine system driven by a servomotor, and using a position feedback to detect a runaway of the servomotor.

[Patent document 1] Japanese Patent Application Unexamined Publication No. 6-209588 (see claim 1 to claim 3, paragraph numbers [0006] to [0012] and [0018], and drawing 1 of the specification).

[Patent document 2] Japanese Patent Publication No. 3091388 (see claim 1 to claim 5, paragraph numbers [0010], [0016,] and [0023] to [0026], and drawing 1 of the specification).

However, according to these methods of detecting an abnormal rotation of a motor based on conventional techniques, when an input speed command changes stepwise, a speed deviation becomes large during acceleration or deceleration of the motor. Therefore, detection of speed deviation excess is prohibited during the acceleration or deceleration. Consequently, there is a problem that even when an abnormal rotation of a motor occurs during acceleration or deceleration, this abnormal rotation cannot be detected.

For example, according to the method described in the patent document 1, at the time of using a motor as a main spindle, an input speed command changes stepwise in many cases. Therefore, when a high speed command is input stepwise and when the motor causes a runaway in an opposite direction, the abnormal rotation of the motor cannot be detected until when a rotation speed of the motor exceeds a predetermined high value that determines an overspeed protection range. Further, an overspeed detector that protects the motor from an overspeed does not operate. Therefore, there is also a problem that a detection of the abnormal rotation of the motor becomes slow.

The abnormal-rotation state of a motor includes a state that the motor rotates at a constant rotation because the actual speed cannot reach a speed command. A position of a magnetic pole that a controller recognizes is different from the actual position of a magnetic pole of the motor. This phenomenon occurs when a torque current Iq that the controller wants to pass and a weak current Id of a magnetic flux become zero as a torque current when observed on the actual motor axis. In this case, the overspeed detector according to the method described in the patent document 1 cannot detect the abnormal rotation of the motor, because the rotation speed of the motor does not exceed the above predetermined value.

On the other hand, the method of detecting a runaway and a runaway detecting apparatus according to claim 2 use a position feedback to detect a runaway of a servomotor. Therefore, there is a problem that this method and this apparatus cannot be used for a main spindle servomotor that uses, in many cases, a speed command motor having no position feedback.

SUMMARY OF THE INVENTION

In order to solve the above problem, it is an object of the present invention to provide a method of controlling a motor and a motor control apparatus that have a function of detecting a runaway of a motor controlled by software servo and that can instantly detect an abnormal rotation of a motor during acceleration or deceleration of the motor to be able to increase the protection performance of the motor.

A motor control apparatus according to the present invention that achieves the above object is a motor control apparatus that controls a rotation speed of a motor driven according to a speed command. The motor control apparatus includes an abnormal-rotation detector that determines that the motor is in an abnormal-rotation state, when a speed deviation obtained by subtracting a detection speed of a motor rotation from a speed command is equal to or larger than a threshold value, when a sign of a product of acceleration obtained by subtracting a last detection speed from a detection speed this time that are detected in a predetermined cycle and a torque command obtained by proportionally integrating the speed deviation is negative, and when an integration value of the speed deviation exceeds a predetermined value.

The above motor control apparatus includes an overspeed detector that initializes a threshold value of an overspeed determination to a value obtained by adding an externally-set speed determination value to an absolute value of a detection speed, when a speed command value supplied in a predetermined cycle is zero and also when a detection speed of the motor is equal to or lower than a set speed which is regarded as a speed zero, and thereafter, determines that the motor is in an abnormal-rotation state, when a detection speed of a motor rotation exceeds a new threshold value of overspeed determination, the new threshold value of overspeed determination being obtained by adding an externally-set speed determination value to a maximum value of a speed command absolute value that is input after the initialization.

In the above motor control apparatus, the driven motor is a synchronous motor having an incremental sensor, and the motor control apparatus includes a magnetic-pole position abnormality detector, that, upon first detecting a one-rotation signal of the incremental sensor after detecting an initial magnetic-pole position showing a direction of a permanent magnet of a stator of the motor, stores the magnetic-pole position from the magnetic axis of the stator winding of the motor at the one-rotation signal detection time, and thereafter, at each time of detecting a one-rotation signal, determines that the motor is in an abnormal-rotation state when an absolute value of a difference between the magnetic-pole position at the one-rotation signal detection time and the magnetic-pole position stored at the detection time of the first one-rotation signal exceeds a predetermined value.

The above motor control apparatus includes a short-circuiting device that short-circuits an input terminal of the motor, when it is determined that the motor is in an abnormal-rotation state.

When it is desired to change an overspeed level to prevent a speed from exceeding a specific level for a main spindle having many kinds of tools, this can be done by changing the setting of the overspeed level for each tool. However, it is troublesome to change the setting of the overspeed level each time when a tool is replaced. According to the present invention, an operator sets a speed command by recognizing a rotation speed for each tool. When a determination speed is added to this speed command to set an overspeed level, the overspeed level necessary for each tool can be automatically set, thereby avoiding the work of resetting the overspeed level. Further, a determination speed can be externally set. The overspeed level can be changed by adding a speed command to this determination speed. Therefore, when the determination speed is externally changed according to a mechanical condition, the overspeed level can be changed more accurately. When a speed command is reset to zero or when a control mode is changed from a speed control mode to a position control mode, it is regarded that a mechanical condition has changed. By resetting the overspeed level, the overspeed level can be set for each tool.

According to the present invention, a determination cannot be made when the overspeed changes in such a mechanical condition. To solve this problem, the invention of claim 2 is applied, that is, an overspeed detector initializes a threshold value of an overspeed determination to a value obtained by adding an externally-set speed determination value to an absolute value of a detection speed, when a speed command value supplied in a predetermined cycle is zero and also when a detection speed of the motor is equal to or lower than a set speed which is regarded as a speed zero, and thereafter, determines that the motor is in an abnormal speed state, when a detection speed of a motor rotation exceeds a new threshold value of overspeed determination, the new threshold value of overspeed determination being obtained by adding an externally-set speed determination value to a maximum value of a speed command absolute value that is input after the initialization.

The present invention has been made to prevent an abnormal rotation that occurs when a number of pulses of a speed sensor or a number of poles of a motor is set wrong, by miscounting a feedback due to noise or the like. When there are these influences, a magnetic-pole position is calculated at a position different from the actual position. Accordingly, the magnetic-pole position recognized by control software is deviated from the actual magnetic-pole position of the motor. As a result, the motor cannot be operated normally, and an abnormal rotation of the motor occurs. According to the present invention, an abnormal rotation can be prevented in advance, by detecting a deviation of a magnetic-pole position and giving an alarm.

The present invention is provided for the case where a synchronous motor is driven in a high-speed rotation that requires a weak magnetic field system. In order to safely stop the motor when an abnormal rotation of the motor is detected, a short-circuiting device disposed between a power converter and a synchronous motor receives a short-circuiting device starting signal, opens a terminal at the power converter side, and short-circuits a terminal at the synchronous motor side. When the motor is in an abnormal-rotation (runaway) state, the motor cannot be stopped. Therefore, a power supply to the motor can be stopped, thereby free running the motor. However, when the motor is free run in a high-speed rotation state which requires a weak magnetic field, there is a risk that the synchronous motor operates as a power generator, and a voltage at a power converter increases to damage the power converter, because the synchronous motor is in a state of generating a high back surge. The present invention short-circuits a stator winding of the synchronous motor to prevent damaging of the power converter, and to safely stop the synchronous motor.

According to the present invention, when it is determined that there is a possibility of the motor being in a runaway state, a speed deviation is integrated, and when this value exceeds a threshold value, the motor can be determined in a runaway state. Therefore, as compared with the motor control apparatus according to the conventional technique, the apparatus according to the present invention can quickly detect an abnormal state.

Further, according to the present invention, a runaway can be also detected in a speed command mode.

Further, according to the present invention, a motor control method and a motor control apparatus have a function of detecting a runaway of a motor controlled by software servo. Therefore, an abnormal rotation of the motor can be detected instantly, thereby increasing protection performance, even during acceleration or deceleration of the motor.

BRIEF DESCRIPTION OF THE DRAWINGS

FIGS. 8A and 8B show changes of an overspeed level 2.

DESCRIPTION OF THE PREFERRED EMBODIMENTS

Figure 1:
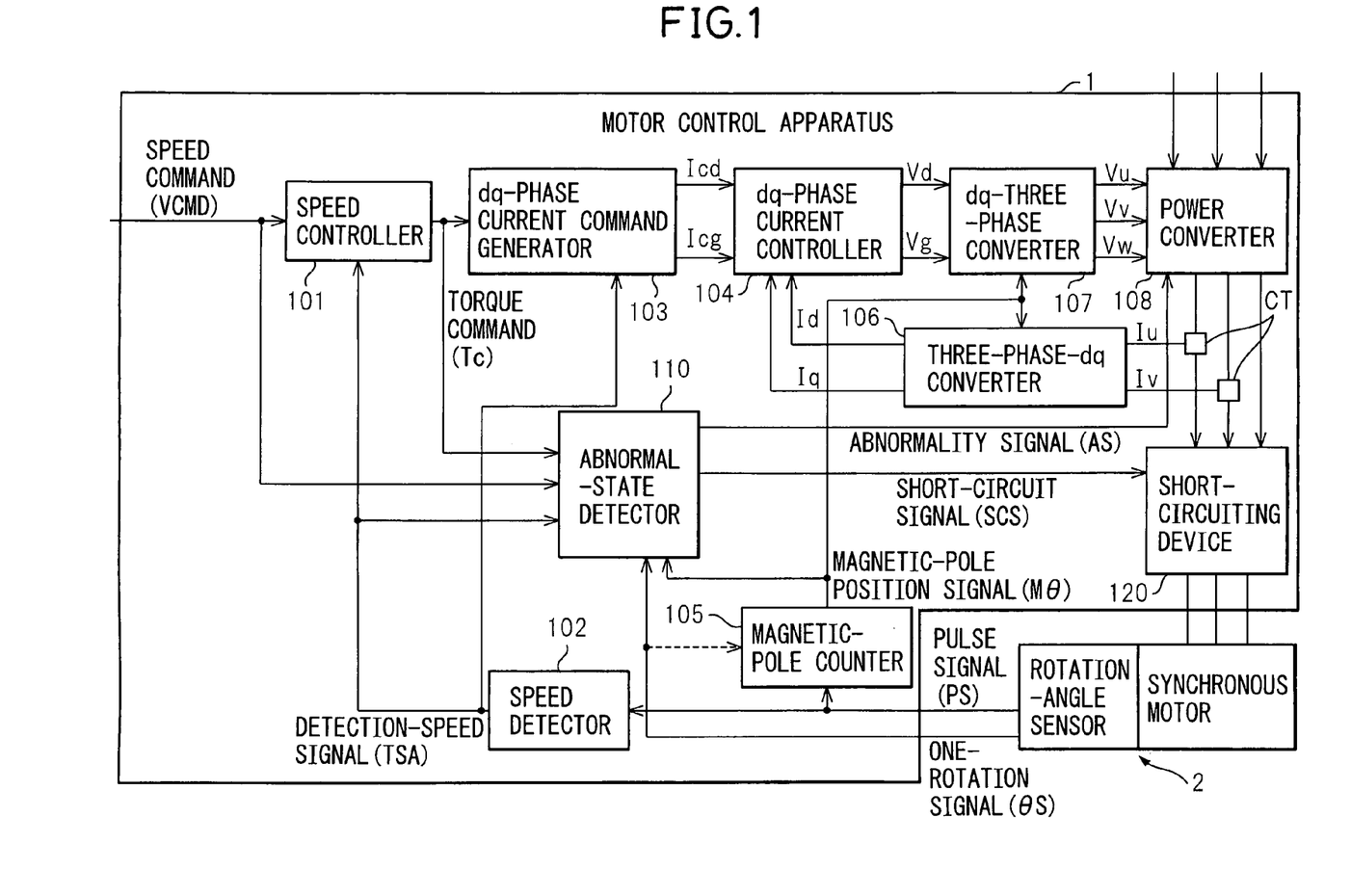
FIG. 1 is a schematic block configuration diagram of a motor control apparatus according to the present invention.

FIG. 1 is a schematic block configuration diagram of a motor control apparatus according to the present invention. A motor control apparatus 1 shown in FIG. 1 is an apparatus that controls a speed and a current of a synchronous motor (hereinafter referred to as a motor) 2. A speed controller 101 receives a speed command VCMD from a numerical controller (hereinafter referred to as an NC) mounted outside such as a programmable controller (hereinafter referred to as a PMC) not shown, and a detection speed signal TSA that is obtained by converting a pulse signal PS output from a rotation angle sensor built in the motor 2 into a rotation speed of the motor by a speed detector 102. The speed controller 101 calculates a speed deviation Ver (=VCMD−TSA), proportionally integrates (PI) this Ver to obtain a torque command Tc, and outputs this Tc. The rotation angle sensor is an incremental encoder, for example, that detects a rotation angle of a rotation axis of the motor 2.

A dq-phase current command generator 103 receives the torque command Tc from the speed controller 101, receives the detection speed signal TSA from the speed detector 102, and generates a d-axis current command value Icd and a q-axis current command value Icq by taking into account high efficiency of the motor and saturation of an output voltage of a power converter 108, following a general expression of vector control. The d-axis means a direction of a permanent magnet of a rotor of the motor 2, and the q-axis means a direction orthogonal with the d-axis.

A dq-phase current controller 104 receives the d-axis current command value Icd and the q-axis current command value Icq from the dq-phase current command generator 103, receives a d-axis current Id and a q-axis current Iq from a three-phase-dq converter 106 described later, and generates a d-axis voltage command value Vd and a q-axis voltage command value Vq.

A magnetic-pole counter 105 is initialized at an initial magnetic pole position of a motor rotor detected in a magnetic pole detection operation that is first carried out after the power supply is turned on, and calculates a relative position pulse output from a rotation angle sensor (an incremental sensor) of the motor 2, thereby producing a magnetic-pole position signal Mθ. When a one-rotation signal θS that is output at a specific position during one rotation of the rotation angle sensor is first detected after the magnetic-pole detection operation, the magnetic-pole counter 105 is reset by a magnetic-pole-position-data AMR-offset corresponding to a one-rotation signal position set in advance, and the magnetic-pole counter 105 continues calculation.

The three-phase-dq converter 106 receives current values Iu and Iv of the u-phase and the v-phase to the motor 2, via a current transformer CT, and generates Iw from Iu+iv+Iw=0 and receives the magnetic-pole position signal Mθ from the magnetic-pole counter 105. The three-phase-dq converter 106 carries out a three-phase-αβ conversion and then αβ-dq conversion, thereby executing a coordinate (three-phase dq) conversion to generate a d-axis current Id and a q-axis current Iq, and outputs Id and Iq to the dq-phase current controller 104.

The dq-three-phase converter 107 receives a d-axis voltage command value Vd and a q-axis voltage command value Vq from the dq-phase current controller 104, and also receives the magnetic-pole position signal Mθ from the magnetic-pole counter 105, and carries out a coordinate reverse (dq-three-phase) conversion, thereby generating three-phase voltage command values Vu, Vv, and Vw.

The power converter 108 receives the three-phase voltage command values Vu, Vv, and Vw from the dq-three-phase converter 107. The power converter 108 applies three-phase alternate current voltage to the stator winding of the motor 2, by executing a pulse width modulation PWM corresponding to the three-phase voltage command values Vu, Vv, and Vw from a DC voltage source obtained by converting the three-phase alternate current supplied from the three-phase AC power source into a DC voltage.

An abnormal-state detector 110 receives the above torque command Tc, the speed command VCMD, the detection speed signal TSA, the one-rotation signal θS, and the magnetic-pole position signal Mθ, and generates an abnormality signal AS and a short-circuit signal SCS described later.

The power converter 108 receives the abnormality signal AS from the abnormal-state detector 110, and interrupts the supply of the three-phase alternate current voltage to the motor 2 after executing a pulse width modulation PWM, that is, the power converter 108 sets the inverter output to off.

A short-circuiting device 120 receives the short-circuit signal SCS from the abnormal-state detector 110, and short-circuits the stator winding of the motor 2.

Figure 2:
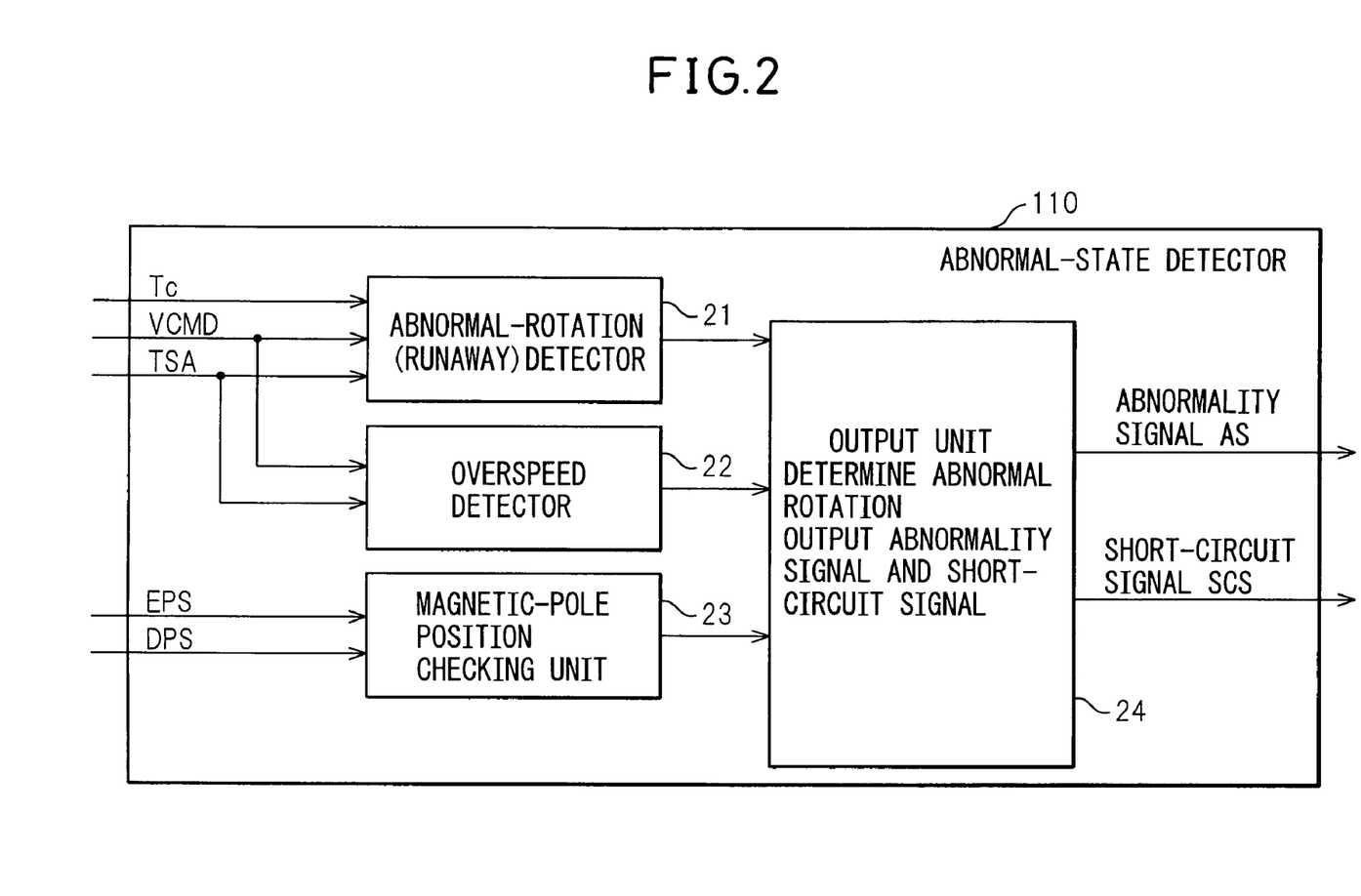
FIG. 2 is a block configuration diagram of an abnormal-state detector shown in FIG. 1.

FIG. 2 is a block configuration diagram of the abnormal-state detector shown in FIG. 1. The abnormal-state detector 110 includes an abnormal-rotation detector 21, an overspeed detector 22, a magnetic-pole position checker 23, and an output unit 24 that determines an abnormal-rotation state of the motor 2 and outputs the abnormality signal SA, and, when it is determined that the motor is in the abnormal-rotation state, outputs the short-circuit signal SCS for short-circuiting the stator winding of the motor 2. A computer executes the functions of these units by executing the process shown in a flowchart described later.

Figure 3:
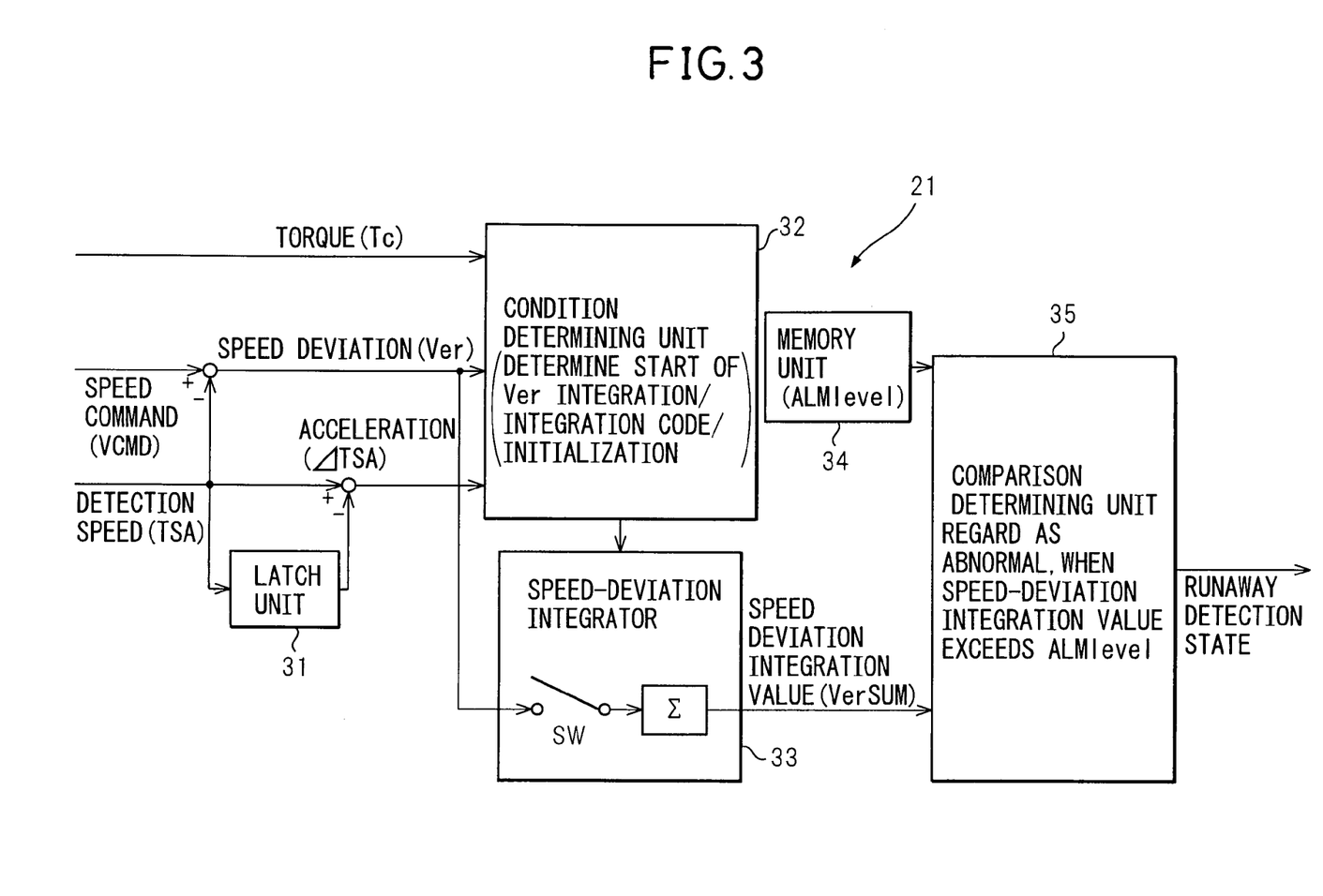
FIG. 3 is an explanatory diagram of a function of the abnormal-rotation state detector shown in FIG. 2.
Figure 4:
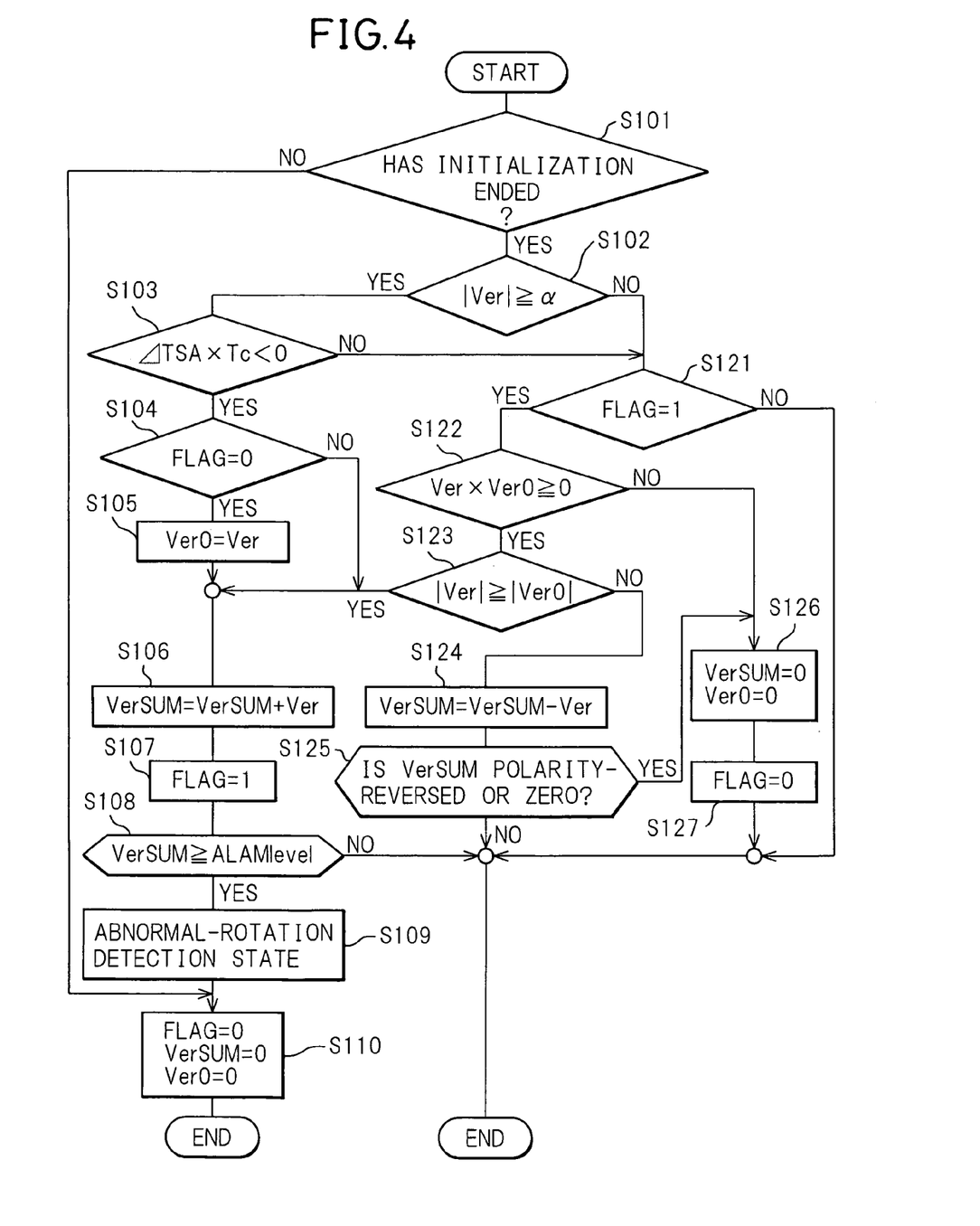
FIG. 4 is a flowchart showing a process of achieving the function of the abnormal-rotation detector.
Figure 5:
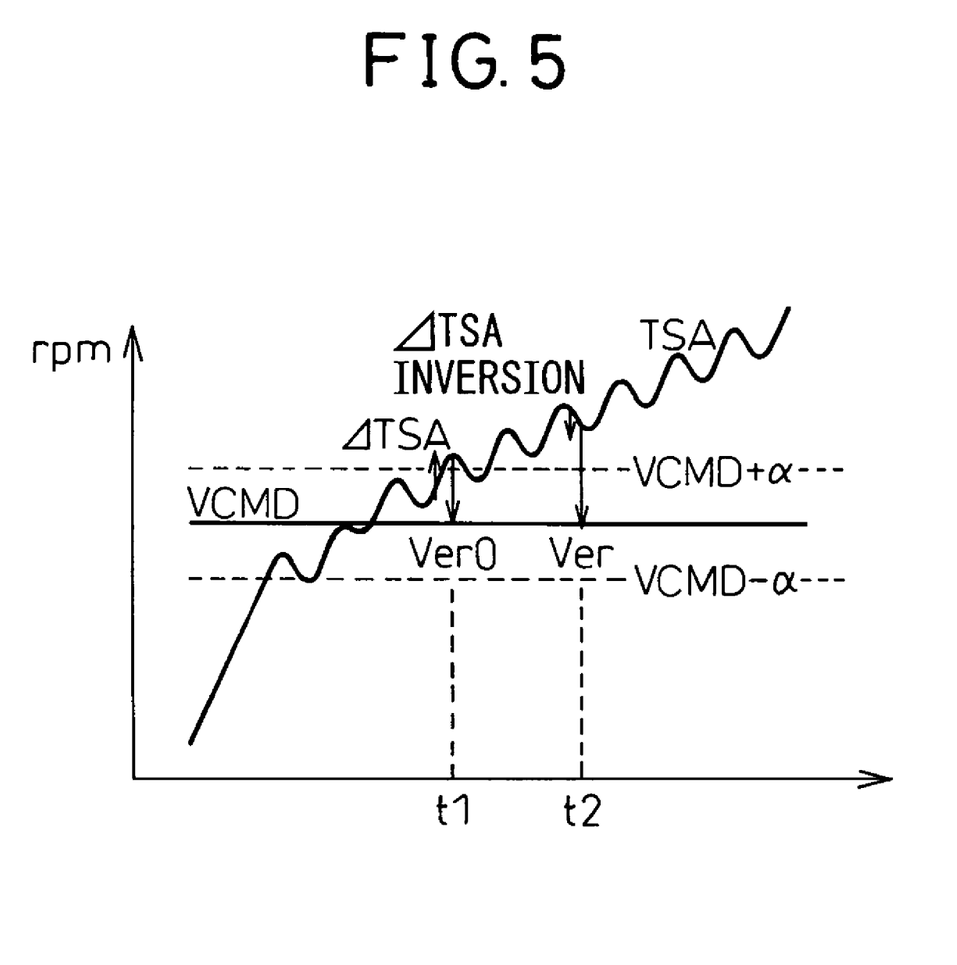
FIG. 5 shows a variation of a detection speed signal TSA from a speed command VCMD.

FIG. 3 is an explanatory diagram of the functions of the abnormal-rotation detector shown in FIG. 2, FIG. 4 is a flowchart showing a processing procedure of executing the functions of the abnormal-rotation detector, and FIG. 5 is a diagram showing a variation of a detection speed signal TSA versus a speed command VCMD. A determination process of the abnormal-rotation state is explained below with reference to FIGS. 3, 4, and 5. The abnormal-rotation detector shown in FIG. 3 receives a torque command Tc, a speed command VCMD, and a detection speed TSA in a predetermined cycle, obtains a speed variation Ver by subtracting the detection speed TSA from the speed command VCMD, and obtains an acceleration ΔTSA by subtracting the detection speed of the last cycle stored in the latch unit 31 from the detection speed TSA of the cycle this time. The above process is explained in detail with reference to FIG. 3 to FIG. 5.

In the following flowchart, S denotes a process step number.

The process of determining a runaway based on a integration value of a speed deviation Ver is explained below, using a flowchart. A summary of the process is as follows. When a speed deviation Ver exceeds a threshold value α, and also when ΔTSA (acceleration)×torque command TSA becomes negative, integration VerSUM of speed deviations is started. When the polarity of the speed deviation is reversed or when a speed deviation integration value (corresponding to a position deviation) is reversed, the speed deviation integration value is initialized. When the speed deviation integration value exceeds the threshold value, the state is determined as an abnormal state.

The process of the flowchart shown in FIG. 4 is executed in a predetermined cycle. First, at step S101, a condition determining unit 32 determines whether a speed command is zero, and a speed is zero, at a magnetic-pole undetected time, at an interruption time of a power supply to the motor 2, and in an alarm state (when the speed deviation integration value VerSUM exceeds an alarm level ALMlevel). When it is determined that the speed deviation integration is not initialized, the process proceeds to step S110, values are initialized (FLG=0, VerSUM=0, Ver=0). When it is determined that the values are initialized, the process proceeds to step S102.

When it is determined at step S102 that an absolute value |ver| of the speed deviation Ver exceeds the threshold value α and also when it is determined at step S103 that a product of the acceleration ΔTSA and the torque command Tc becomes negative, a speed deviation integrator 33 starts integration of the speed deviation Ver (VerSUM=VerSUM+Ver) at step S106 by turning on a switch SW. At step S107, FLAG is set to 1. At step S108, a comparison determining unit 35 determines whether the speed deviation integration value VerSUM exceeds the threshold value ALMlevel as a set value stored beforehand in a memory unit 34. When it is determined that the speed deviation integration value VerSUM exceeds the threshold value ALMlevel, it is determined at step S109 that the motor 2 is in the abnormal-rotation state. At step S110, the values are initialized. During this period, it is determined at step S104 whether FLAG is 0 or 1. When FLAG is zero, the speed deviation at the time of the first establishment of the abnormal-rotation condition is set to Ver0. When FLAG is 1, the process proceeds to step S106.

On the other hand, when it is determined at step S102 that the absolute value |Ver| of the speed deviation Ver does not exceed the threshold value α, it is determined at step S121 whether FLAG is 0 or 1. When FLAG is zero, that is, when the abnormal-rotation state is not established continuously, the present process ends. When FLA is 1, that is, when an abnormal rotation cannot be determined after once regarding the state as an abnormal-rotation state, the process proceeds to step S122.

When the polarity of the speed deviation Ver in the relation of Ver×Ver0<0 is reversed at step S122, the process proceeds to steps S126 and S127. When the polarity of the speed deviation Ver in the relation of Ver×Ver0≧0 is not reversed at step S122, the process proceeds to step S123. At step S122, when the polarity of the speed deviation in the cycle this time is reversed versus the speed deviation Ver0 when the state is first regarded as the abnormal-rotation state, the detection speed signal TSA obtained by converting the pulse signal PS into the rotation speed intersects with the speed command VCMD. In this case, there is a possibility that the rotation is normal. Therefore, in this case, the process proceeds to step S126, and the detection state is initialized to prevent an erroneous detection. On the other hand, at step S122, when the polarity of the speed deviation in the cycle this time is the same as the polarity of the speed deviation Ver0 when the state is first regarded as the abnormal-rotation state, there is a possibility that the rotation is abnormal. Therefore, in this case, the process proceeds to step S123. When |ver| is equal to or larger than |Ver0| at step S123, the state is determined as an abnormal state, and the process proceeds to step S106. When |Ver| is smaller than |Ver0| at step S123, the state is determined as normal, and the process proceeds to step S124.

In FIG. 5, the lateral axis shows a time axis t, and the vertical axis shows a rotation number rpm. As shown in FIG. 5, when the detection speed TSA changes, ΔTSA faces a direction opposite to the direction of the normal state at time t1, and this state can be determined as the abnormal-rotation state at step S122. However, at time t2, ΔTSA faces a direction same as the direction of the normal state, and this state cannot be necessarily determined as the abnormal-rotation state. In this case, it is determined at step S123 that the speed deviation Ver increases, and the process proceeds to step S109 via steps S106 to S108, and it is determined that the rotation is in the abnormal-rotation state.

At step S124, VerSUM=VweSUM−Ver is calculated. When the integration value (corresponding to the position deviation) VerSUM of the speed deviation Ver has a reversed polarity or becomes zero at step S125, the process proceeds to step S126, and the values are initialized as VerSUM=0 and Ver=0. At step S127, FLAG is initialized to zero. When the integration value (corresponding to the position deviation) VerSUM of the speed deviation Ver does not have a reversed polarity or does not become zero at step S125, the process ends. When the state cannot be regarded as the abnormal-rotation state at step S125, the state is once regarded as the abnormal-rotation state. When the integration value subtracted by the integration speed deviation becomes equal to or smaller than zero, it is regarded that the integration is started by error, and the value is initialized to avoid an erroneous detection.

Next, the overspeed detection process according to the speed command is explained. In short, changing the overspeed level OVRSP2 according to the command speed VCMD works as an auxiliary function of the detection of an abnormal rotation. The operation also works to protect against overspeed in the state of not being able to carry out a high-speed rotation due to a mechanical condition. An overspeed level OVERSP2 is set variable according to the speed command VCMD as follows, and is changed according to the speed command VCMD as shown in FIGS. 8A and 8B. When the detection speed TSA exceeds this level for some reason, the state is determined as an overspeed detection state. The above process is explained with reference to FIG. 6 to FIGS. 8A and 8B.

Figure 6:
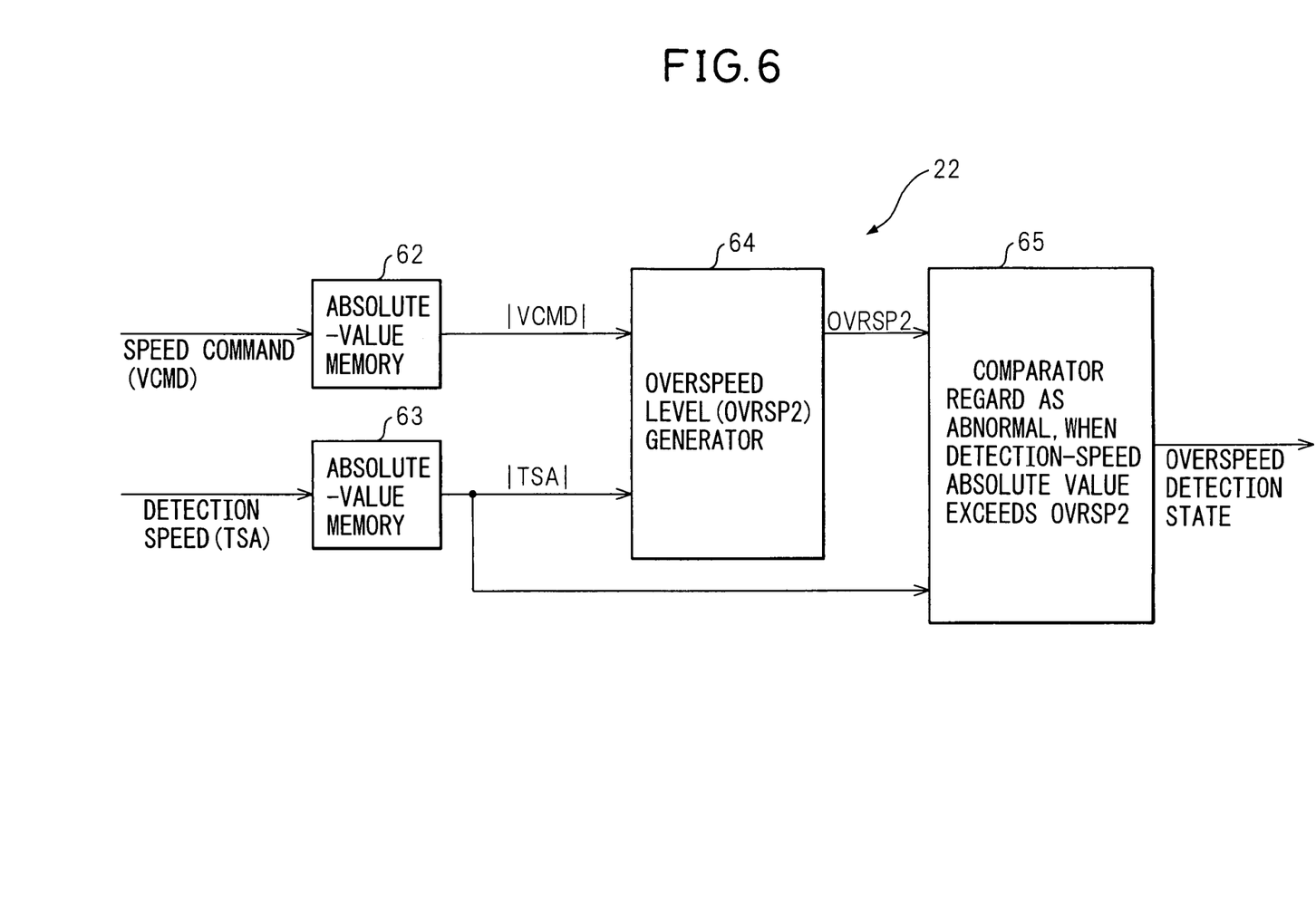
FIG. 6 is an explanatory diagram of the function of an overspeed detector shown in FIG. 2.
Figure 7:
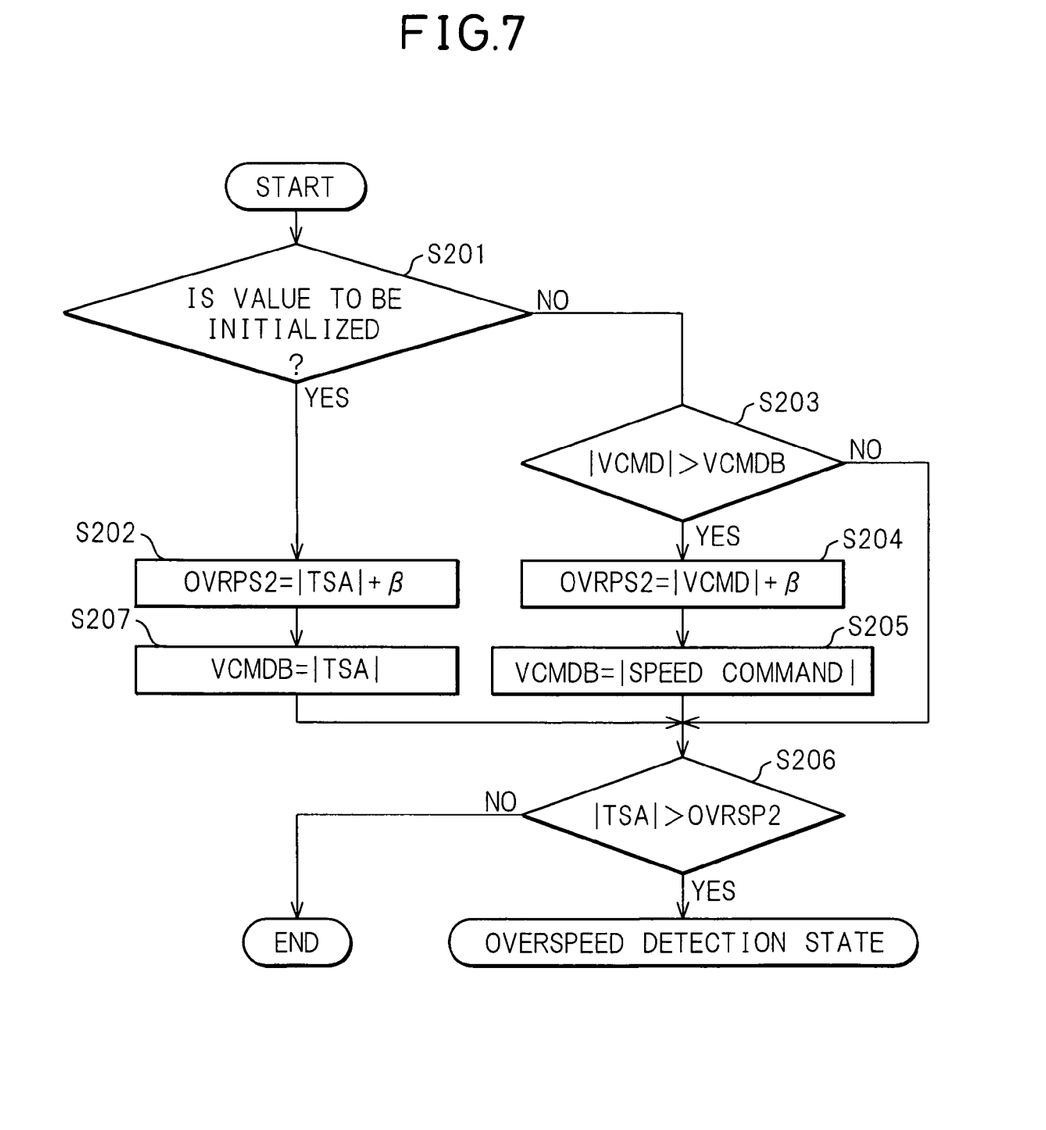
FIG. 7 is a flowchart showing a process of achieving the function of the overspeed detector.
Figure 8A:
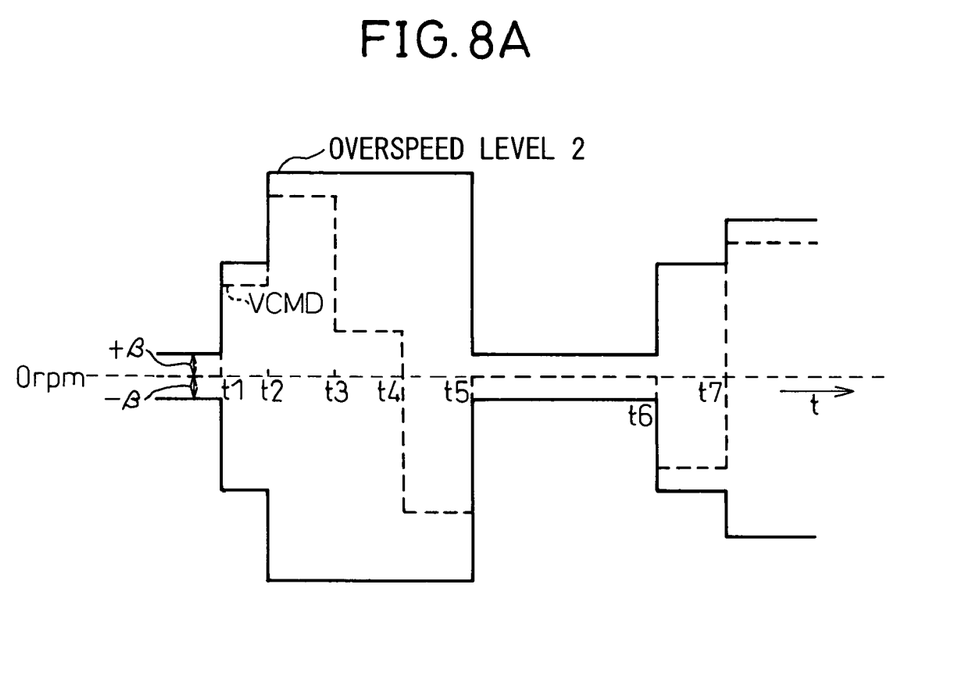
FIG. 8A shows a change of the overspeed level 2 that is shifted according to a change of a speed command.
Figure 8B:
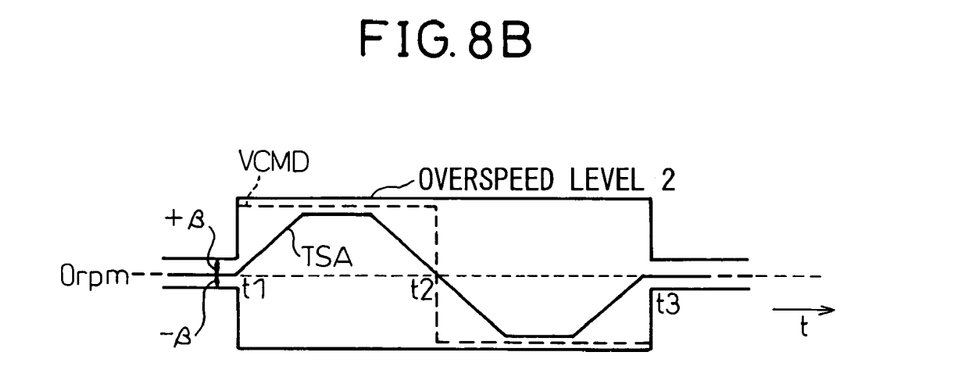
FIG. 8B shows a change of the overspeed level 2 from a detection speed that changes at equal acceleration.

FIG. 6 is an explanatory diagram of the function of the overspeed detector shown in FIG. 2, and FIG. 7 is a flowchart showing a processing procedure of achieving the function of the overspeed detector. The process of determining the overspeed state is explained below with reference to FIG. 6 and FIG. 7. The overspeed detector shown in FIG. 6 receives a speed command VCMD and a detection speed TSA in a predetermined cycle, and stores an absolute value |VCMD| of the speed command VCMD in each cycle into an absolute-value memory 62, and stores an absolute value |TSA| of the detection speed TSA in each cycle into an absolute-value memory 63.

At step S201, it is determined whether initialization is to be carried out. It is determined that initialization should be carried out, immediately after the power supply is turned on, immediately after an alarm occurs, when the speed command is zero, or when the control mode changes and also when the motor detection speed is equal to or lower than a set speed which is regarded as a speed zero state, and the process proceeds to step S202. When it is determined that initialization should not be carried out, the process proceeds to step S203.

An overspeed level OVRSP2 generator 64 adds an externally-set speed determination value β for an overspeed level to the detection speed absolute value |TSA| stored in the memory 63 at step S202, thereby initializing the detection speed absolute value as a new overspeed level OVRSP2. The overspeed level OVRSP2 further initializes the VCMDB with the detection speed absolute value |TSA|, and the process proceeds to step S206.

At step S203, a maximum speed command absolute value (a speed command absolute value at the time of calculating the overspeed level OVRSP2) VCMDB stored after initializing the overspeed determination threshold value is compared with the absolute value |VCMD| of the this-time speed command stored in the absolute value memory 62. When |VCMN| is larger than VCMDB, the process proceeds to step S204. At step S204, the externally-set speed determination value β is added to the absolute value |VCMD| of the this-time speed command stored in the absolute value memory 62, thereby generating a new overspeed level OVRSP2. At step S205, VCMDB is replaced with the speed command absolute value this time. When |VCMD| is equal to or smaller than VCBDB, the process proceeds to step S206.

A comparator 65 compares the overspeed level OVRSP2 with the detection speed absolute value |TSA| at step S206. When |TSA| is larger than OVRSP2, the state is determined as the overspeed state, and when |TSA| is equal to or smaller than OVRSP2, the process ends.

FIG. 8A and FIG. 8B show changes of the overspeed level 2. FIG. 8A shows a change of the overspeed level 2 that is shifted according to a change of the speed command, and FIG. 8B shows a detection speed that changes at equal acceleration and a change of the overspeed level 2. In FIGS. 8A and 8B, the lateral axis denotes time t, and the vertical axis denotes a rotation number rpm. As shown in FIG. 8A, it is clear that the overspeed level 2 shifts at five stages as shown by solid lines according to seven changes at times t1, t2, t3, . . . , t7 of the speed command VCMD shown by broken lines. As shown in FIG. 8B, it is clear that the detection speed TSA shown by solid lines change according to three changes at times t1, t2, t3 of the speed command VCMD shown by broken lines, and that the overspeed level 2 shifts at three stages as shown by a thin solid line.

Next, the check process of a magnetic-pole position corresponding to the one-rotation signal position of the synchronous motor 2 is explained. A summary of the process is as follows. After executing an AMR offset (a process of replacing a magnetic-pole position corresponding to a one-rotation signal with a set magnetic-pole position when the one-rotation signal is first detected after detecting the magnetic pole), a magnetic-pole position corresponding to a one-rotation signal is obtained each time when the one-rotation signal is detected, and this magnetic-pole position is compared with the AMR offset value. When a deviation is equal to or larger than a threshold value, the state is determined as an abnormal state. In this process, when there is a miss of a speed feedback, accumulation of this miss which causes the motor to be in an abnormal-rotation state can be prevented. An abnormal state is notified to an operator, thereby making the operator recognize that the feedback system of the motor speed control is abnormal. The above process is described in detail with reference to FIG. 9 and FIG. 10.

Figure 9:
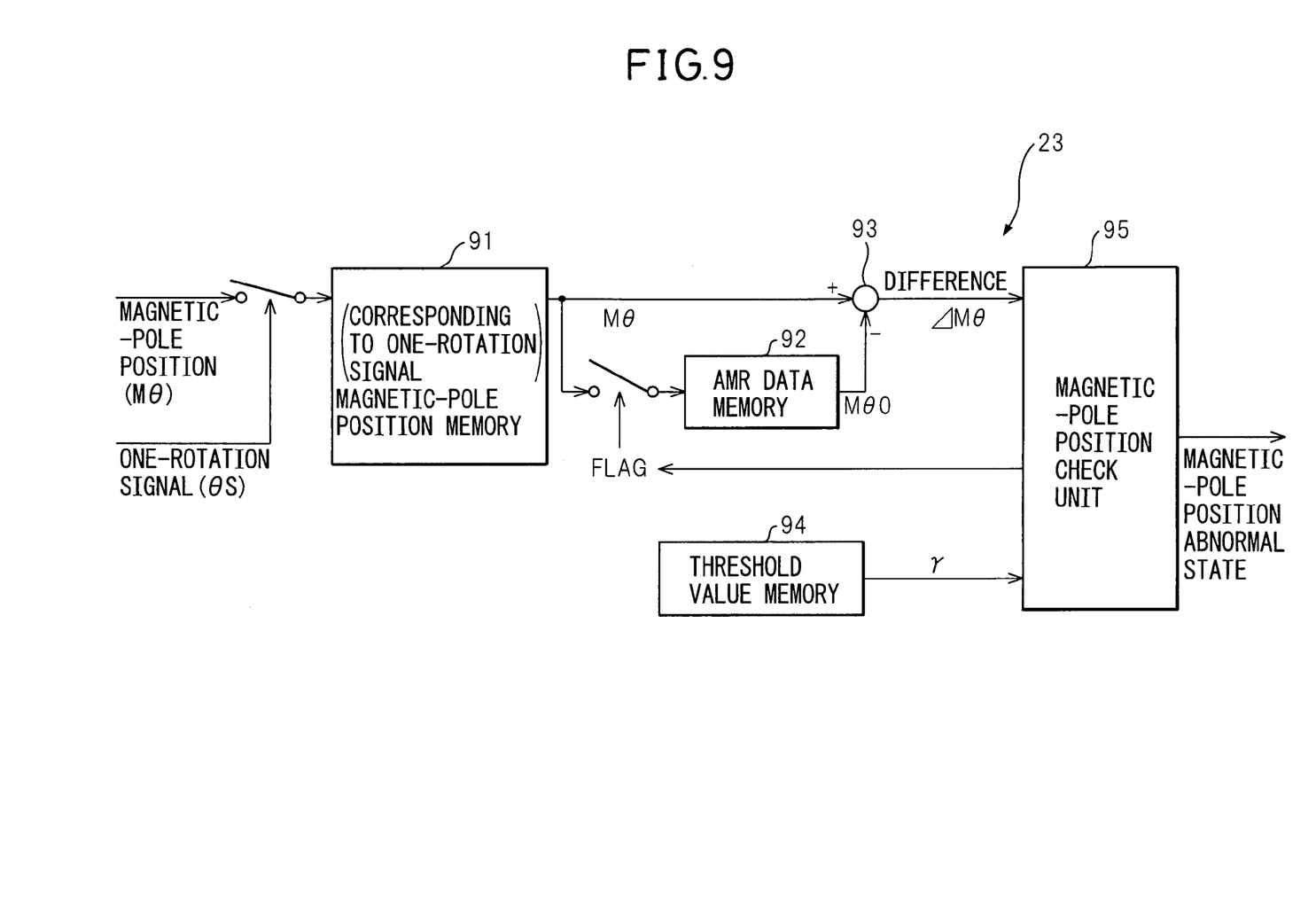
FIG. 9 is an explanatory diagram of the function of a magnetic-pole position checking unit shown in FIG. 2.
Figure 10:
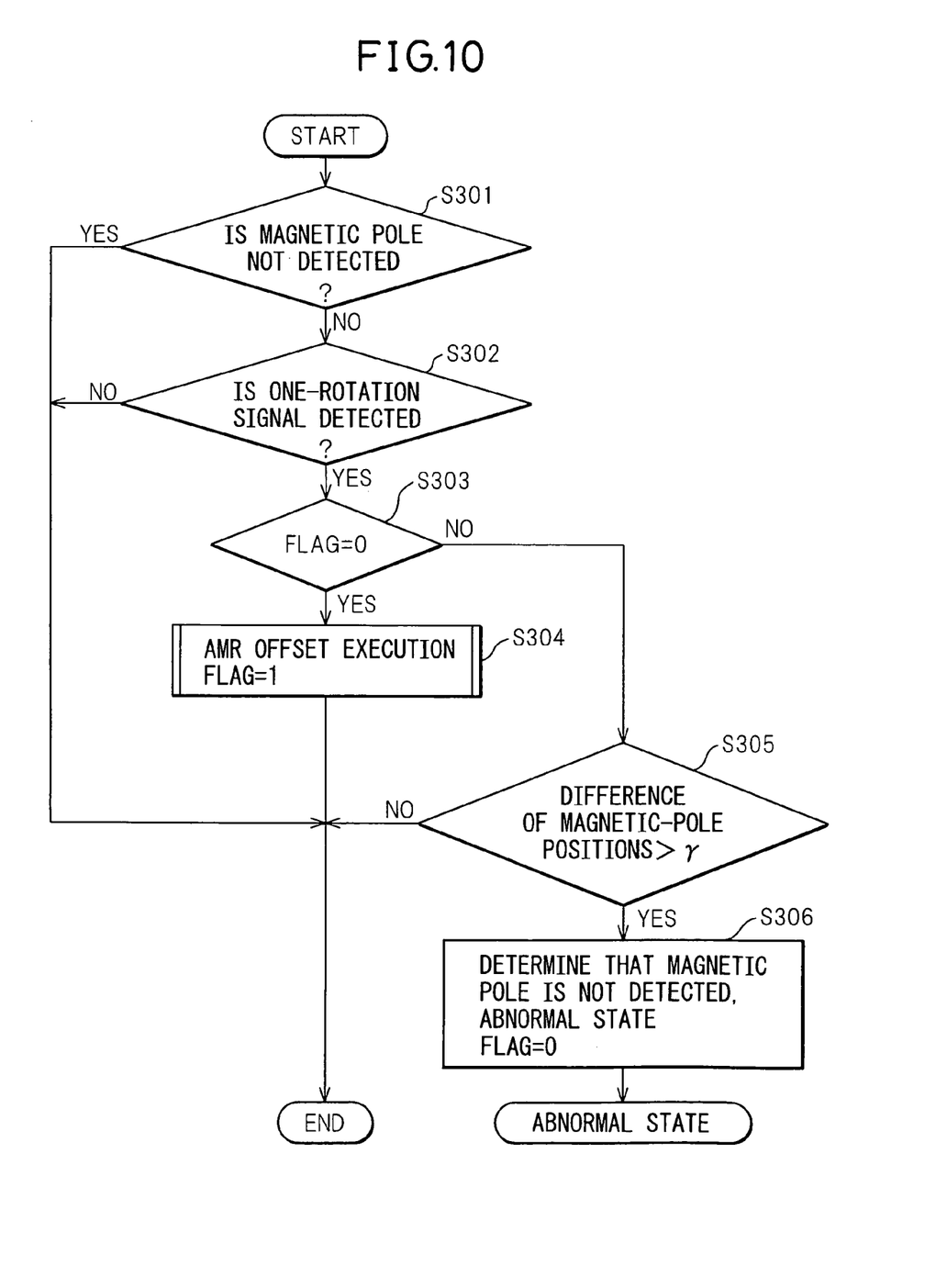
FIG. 10 is a flowchart showing a process of achieving the function of the magnetic-pole position checking unit.

FIG. 9 is an explanatory diagram of the function of the magnetic-pole position checking unit shown in FIG. 2, and FIG. 10 is a flowchart showing a processing procedure of achieving the function of the magnetic-pole position checking unit. The magnetic-pole position check process is explained with reference to FIG. 9 and FIG. 10. The magnetic-pole position checking unit shown in FIG. 9 receives a magnetic-pole position Mθ and a one-rotation signal θS for each one rotation of the motor 2. When it is determined that a magnetic pole is not detected at step S301, the process ends. When it is determined that a magnetic pole is detected at step S301, the process proceeds to step S302, and it is determined whether the one-rotation signal θS is detected. When it is determined that θS is detected, it is determined whether FLAG is 0 or 1 at step S303. When it is determined that FLAG=0, the process proceeds to step S304, and an AMR offset is executed. When it is determined that FLA=1, the process proceeds to step S305, and it is determined that the magnetic-pole position is abnormal.

At step S304, the magnetic-pole position Mθ corresponding to the one-rotation signal is first stored into a magnetic-pole position memory 91. Then, the AMR offset value Mθ as an electric angle from the stator winding magnetic pole of the one-rotation signal at the time of first detecting the one-rotation signal θS after determining the magnetic-pole position is stored into an AMR data memory 92. Next, a subtracter 93 subtracts the AMR offset value Mθ stored in the AMR data memory 92 from the magnetic-pole position Mθ corresponding to the one-rotation signal stored in the magnetic-position memory 91, thereby obtaining a difference ΔMθ (=Mθ− Mθ0) of the magnetic-pole position. Last, FLAG is set to 1.

On the other hand, a threshold value γ is stored in a threshold memory 94. When a magnetic-pole position checking unit 95 determines at step S305 that the difference ΔMθ of the magnetic-pole position is larger than the threshold value γ, the magnetic-pole position checking unit 95 determines at step S306 that the magnetic pole is not detected, and resets FLAG to zero. When it is determined at step S305 that ΔMθ is equal to or smaller than the threshold value γ, the present process ends.

Figure 11:
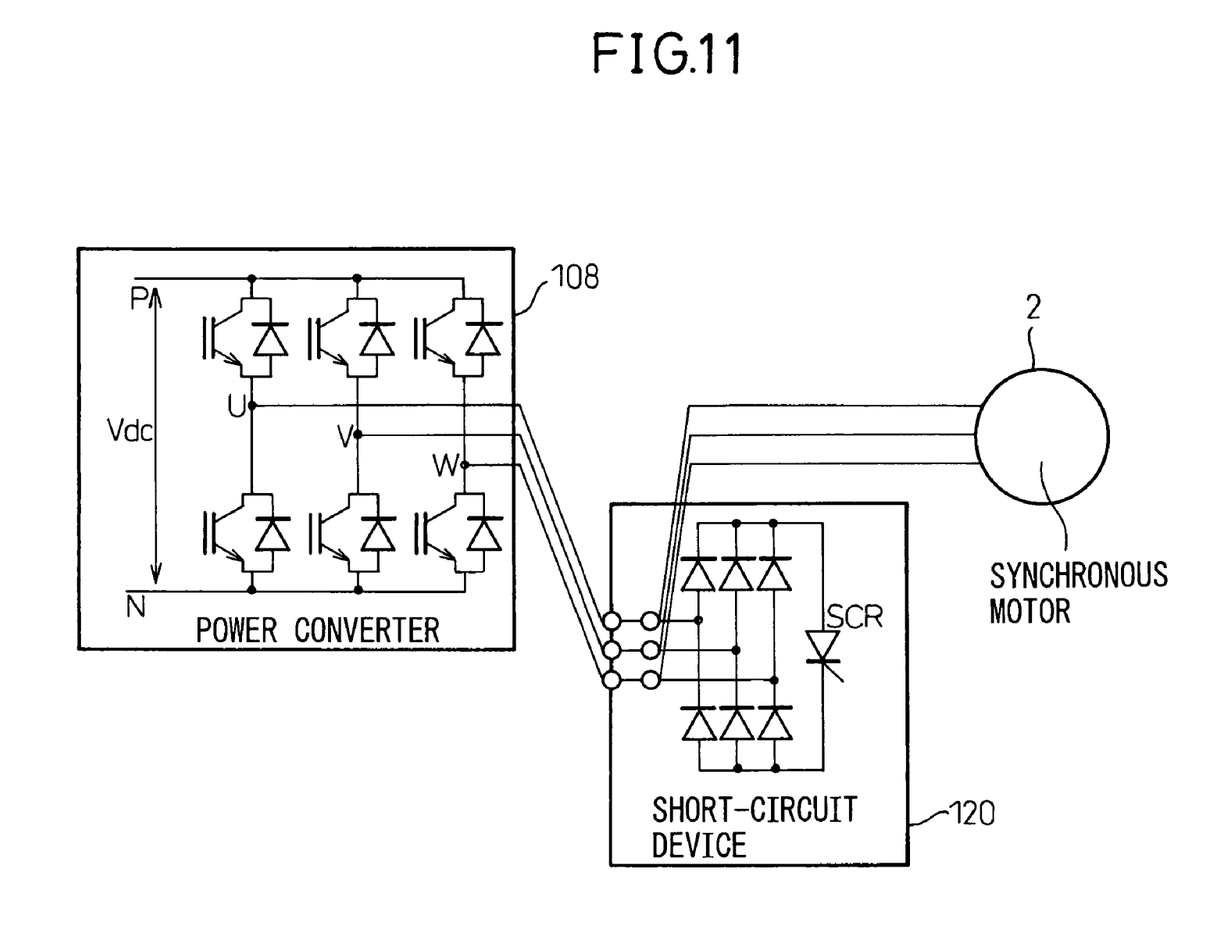
FIG. 11 shows one embodiment of a power converter and a short-circuiting device shown in FIG. 1.

FIG. 11 shows one embodiment of the power converter and the short-circuiting device shown in FIG. 1. The power converter 108 shown in FIG. 11 rectifies a three-phase alternate current supplied from a three-phase alternate current power supply, converts the current into a direct current, and obtains a DC power source of the direct current voltage Vdc. The power converter 108 receives the three-phase voltage command values Vu, Vv, Vw from the dq-three-phase converter 107 shown in FIG. 1, carries out a pulse width modulation PWM by switching six transistors of the DC power source according to these three-phase voltage command values, and adds a three-phase alternate current voltage to the motor 2. The power converter 108 receives the abnormality signal AS from the abnormal-state detector 110 shown in FIG. 1, and interrupts the supply of the pulse-width-modulated PWM three-phase alternate voltage to the motor 2. In other words, the power converter 108 turns off the six transistors to set the inverter output to off. The abnormality signal AS is notified to the outside of the motor control device 1, for example, the NC. The NC displays the motor rotation abnormality on the screen of the display. Usually, a recognition process of the magnetic-pole (d axis) position of the synchronous motor controlled by the NC is executed when the power supply is turned on. Whether the magnetic-pole-position-recognizing process of the motor has ended or not is displayed on the display screen of the NC.

On the other hand, the short-circuiting device 120 shown in FIG. 11 receives the short-circuit signal SCS from the abnormal-state detector 110 shown in FIG. 1, turns on the SCR that is usually off, and short-circuits the winding of the stator of the motor 2. When the abnormal state of the motor is detected, the short-circuit device 120 disposed between the motor and the power converter short-circuits the winding of the stator of the synchronous motor 2, and can stably stop the synchronous motor.

What is claimed is:

1. A motor control method for controlling a rotation speed of a motor that is driven according to a speed command, wherein it is determined that the motor is in an abnormal-rotation state when a speed deviation obtained by subtracting a detection speed of a motor rotation from a speed command is equal to or larger than a threshold value, when a sign of a product of acceleration obtained by subtracting a last detection speed from a detection speed this time that are detected in a predetermined cycle and a torque command obtained by proportionally integrating the speed deviation is negative, and when an integration value of the speed deviation exceeds a predetermined value.

2. The motor control method according to claim 1, wherein a threshold value of an overspeed determination is initialized to a value obtained by adding an externally-set speed determination value to an absolute value of a detection speed, when a speed command value supplied in a predetermined cycle is zero and also when a detection speed of the motor is equal to or lower than a set speed which is regarded as a speed zero, and thereafter, it is determined that the motor is in an abnormal-rotation state, when a detection speed of a motor rotation exceeds a new threshold value of overspeed determination, the new threshold value of overspeed determination being obtained by adding an externally-set speed determination value to a maximum value of a speed command absolute value that is input after the initialization.

3. The motor control method according to claim 1, wherein the driven motor is a synchronous motor having an incremental sensor, and when one-rotation signal of the incremental sensor is first detected after detecting an initial position of a magnetic pole showing a direction of a permanent magnet of a stator of the motor, the magnetic-pole position from the magnetic axis of the stator winding of the motor at the one-rotation signal detection time is stored, and thereafter, at each time of detecting a one-rotation signal, when an absolute value of a difference between the magnetic-pole position at the one-rotation signal detection time and the magnetic-pole position stored at the first detection time of a one-rotation signal exceeds a predetermined value, it is determined that the motor is in an abnormal-rotation state.

4. The motor control method according to claim 2, wherein the driven motor is a synchronous motor having an incremental sensor, and when one-rotation signal of the incremental sensor is first detected after detecting an initial position of a magnetic pole showing a direction of a permanent magnet of a stator of the motor, the magnetic-pole position from the magnetic axis of the stator winding of the motor at the one-rotation signal detection time is stored, and thereafter, at each time of detecting a one-rotation signal, when an absolute value of a difference between the magnetic-pole position at the one-rotation signal detection time and the magnetic-pole position stored at the first detection time of a one-rotation signal exceeds a predetermined value, it is determined that the motor is in an abnormal-rotation state.

5. The motor control method according to claim 1, wherein when it is determined that the motor is in an abnormal-rotation state, an input terminal of the motor is short-circuited.

6. The motor control method according to claim 2, wherein when it is determined that the motor is in an abnormal-rotation state, an input terminal of the motor is short-circuited.

7. The motor control method according to claim 3, wherein when it is determined that the motor is in an abnormal-rotation state, an input terminal of the motor is short-circuited.

8. The motor control method according to claim 4, wherein when it is determined that the motor is in an abnormal-rotation state, an input terminal of the motor is short-circuited.

9. A motor control apparatus that controls a rotation speed of a motor driven according to a speed command, the motor control apparatus comprising an abnormal-rotation detector that determines that the motor is in an abnormal-rotation state when a speed deviation obtained by subtracting a detection speed of a motor rotation from a speed command is equal to or larger than a threshold value, when a sign of a product of acceleration obtained by subtracting a last detection speed from a detection speed this time that are detected in a predetermined cycle and a torque command obtained by proportionally integrating the speed deviation is negative, and when an integration value of the speed deviation exceeds a predetermined value.

10. The motor control apparatus according to claim 9, further comprising an overspeed detector that initializes a threshold value of an overspeed determination to a value obtained by adding an externally-set speed determination value to an absolute value of a detection speed, when a speed command value supplied in a predetermined cycle is zero and also when a detection speed of the motor is equal to or lower than a set speed which is regarded as a speed zero, and thereafter, determines that the motor is in an abnormal-rotation state, when a detection speed of a motor rotation exceeds a new threshold value of overspeed determination, the new threshold value of overspeed determination being obtained by adding an externally-set speed determination value to a maximum value of a speed command absolute value that is input after the initialization.

11. The motor control apparatus according to claim 9, wherein the driven motor is a synchronous motor having an incremental sensor, and the motor control apparatus further comprises a magnetic-pole position abnormality detector, that, upon first detecting a one-rotation signal of the incremental sensor after detecting an initial magnetic-pole position showing a direction of a permanent magnet of a stator of the motor, stores the magnetic-pole position from the magnetic axis of the stator winding of the motor at the one-rotation signal detection time, and thereafter, at each time of detecting a one-rotation signal, determines that the motor is in an abnormal-rotation state when an absolute value of a difference between the magnetic-pole position at the one-rotation signal detection time and the magnetic-pole position stored at the detection time of the first one-rotation signal exceeds a predetermined value.

12. The motor control apparatus according to claim 10, wherein the driven motor is a synchronous motor having an incremental sensor, and the motor control apparatus further comprises a magnetic-pole position abnormality detector, that, upon first detecting a one-rotation signal of the incremental sensor after detecting an initial magnetic-pole position showing a direction of a permanent magnet of a stator of the motor, stores the magnetic-pole position from the magnetic axis of the stator winding of the motor at the one-rotation signal detection time, and thereafter, at each time of detecting a one-rotation signal, determines that the motor is in an abnormal-rotation state when an absolute value of a difference between the magnetic-pole position at the one-rotation signal detection time and the magnetic-pole position stored at the detection time of the first one-rotation signal exceeds a predetermined value.

13. The motor control apparatus according to claim 9, further comprising a short-circuiting device that short-circuits an input terminal of the motor, when it is determined that the motor is in an abnormal-rotation state.

14. The motor control apparatus according to claim 10, further comprising a short-circuiting device that short-circuits an input terminal of the motor, when it is determined that the motor is in an abnormal-rotation state.

15. The motor control apparatus according to claim 11, further comprising a short-circuiting device that short-circuits an input terminal of the motor, when it is determined that the motor is in an abnormal-rotation state.

16. The motor control apparatus according to claim 12, further comprising a short-circuiting device that short-circuits an input terminal of the motor, when it is determined that the motor is in an abnormal-rotation state.

* * * * *